LEAKAGE-LIMITING DEVICES FOR ROTATIVE MACHINERY APPLICATION

Original Filed Dec. 20, 1965 2 Sheets-Sheet 1

INVENTOR
JOSEPH M. JAEGER
BY James Albert Drobile
ATTORNEY

LEAKAGE-LIMITING DEVICES FOR ROTATIVE MACHINERY APPLICATION

Original Filed Dec. 20, 1965 2 Sheets-Sheet 2

INVENTOR
JOSEPH M. JAEGER
BY James Albert Drobile
ATTORNEY

United States Patent Office

Re. 27,350
Reissued May 9, 1972

27,350

LEAKAGE-LIMITING DEVICES FOR ROTATIVE MACHINERY APPLICATION

Joseph M. Jaeger, Woodcliff Lake, N.J., assignor to Jemco Seals, Inc., New York, N.Y.

Original No. 3,460,843, dated Aug. 12, 1969, Ser. No. 514,887, Dec. 20, 1965. Application for reissue Nov. 12, 1970, Ser. No. 89,154
Int. Cl. F16j *15/48*
U.S. Cl. 277—26 7 Claims

Matter enclosed in heavy brackets [ ] appears in the original patent but forms no part of this reissue specification; matter printed in italics indicates the additions made by reissue.

ABSTRACT OF THE DISCLOSURE

A leakage-limiting device to be situated between rotary and non-rotary components of a machine. The device includes a leakage-limiting ring to surround a rotative member of the machine with clearance under static conditions. A means is provided for fixing the ring to the non-rotative member of the machine, and a means is provided for retaining this fixed relationship under static conditions. The ring has a low coefficient of friction which will prevent any damage to the rotative member if there should be engagement between the latter and the ring during starting up of the machine. On the other hand, the ring has a coefficient of thermal expansion substantially in excess of those of the materials from which the rotative and non-rotative machinery members are constructed, so that during increase of the temperature of the machine parts to their normal operating temperatures the ring will tend to expand away from the rotative member. However, the positioning and retaining means act on the ring to restrain the latter from radial and circumferential expansion during the temperature rise, and instead to constrain the ring to expand centripetally toward the rotative machine member, thus reducing the clearance with resulting decreased leakage and increased efficiency.

Figure 1:
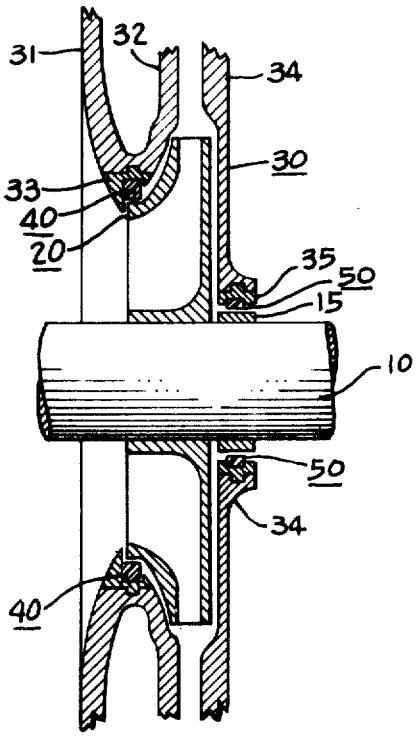

This invention relates to devices for substantially sealing fluid chambers in machinery one from another and from the ambient atmosphere. In particular, the invention relates to devices for limiting the leakage between fluid chambers formed by one or more elements or members of a machine with another or other machine elements or members in relative rotative motion. The invention specifically is directed to leakage-limiting devices, such as rings, of the "static" type, for use in rotative machinery applications. By "static" type it is meant that no contact is intended between the device and the relatively moving parts but that a very close clearance be established and maintained.

The rotative, or "turbo," type of fluid machinery to which this invention principally applies is illustrated by vacuum pumps, fans, blowers, compressors, expanders, and pumps, and includes gas and liquid equipment of either the dynamic, positive displacement or regenerative types, such as axial, centrifugal, centripetal, turbine, rotary and sliding-vane equipment. This equipment may embody casings of either the horizontal- or vertical-split type, or both. In such fluid-handling equipment, it is necessary to provide a leakage-limiting device or devices between chambers thereof containing different fluids or fluids under different pressures, in order to minimize contamination and leakage, and to maintain high efficiency in operation.

Suitable sealing devices are available for machinery applications where the relative motion between various parts of the machine is rectilinear. However, in rotative or turbo machinery, where the relative motion is curvilinear or rotative, much higher speeds often are encountered. These higher speeds can give rise to special problems which make much more difficult the provision of satisfactory leakage-limiting devices for such equipment. For example, rotative machinery utilizing relatively high speeds usually requires flexible shafts which exhibit a so-called critical speed range during which vibration and deformation are at a maximum. The critical speed range is experienced during start-up and is passed by the time operating speeds are reached.

Typical of the locations in rotative equipment which require suitable leakage-limiting devices are zones such as those between the casing and the shaft, separating external and internal atmospheres; the leading and trailing edges of individual impellers and corresponding areas of the casing, separating zones of different pressure, i.e., interstage zones; and the like. In general, the leakage-limiting devices of this invention find application anywhere there is a need to limit leakage through a zone formed by one part or member of a machine and another part or member moving rotatively in relation to the first.

Heretofore, leakage-limiting devices employed in rotative machinery applications have been of either the metallic labyrinth or solid carbon types. Metals heretofore employed the fabrication of metal labyrinth devices include aluminum, bronze, stainless steel, and the like. These metallic devices and solid carbon devices suffer from several serious disadvantages which are avoided by the practice of the present invention. First of all, because of the relatively high speeds experienced in equipment of the type here of principal although not exclusive interest, it is almost essential that there should be no actual contact between the device and the rotating element or member of the machine. Thus, while it is desirable to minimize clearances so as to reduce leakage and improve efficiency, it is essential that sufficient running clearance be provided to avoid contact under all operating conditions, including starting-up and shutting-down, although before shutting-down, the machines normally are idled and the same problems are not experienced, at least not to the same degree. In the case of the metallic labyrinth type of device, its contact with the rotating element causes its partial permanent deformation or destruction. Furthermore, contact between a solid carbon device and the rotating element results in damage to the latter by gouging as well as in a permanent deformation or even a partial destruction of the carbon device. Leakage-limiting devices of this nature and of these materials also are unduly limited in their applications because of their susceptibility to damage from dirt and polymerized fluids, to corrosion, to excessive wear, and to causing damage to rotating parts, and because of the difficulty and expense involved in their manufacture, installation and maintenance.

In view of the above, it is a principal object of the present invention to provide an improved sealing system of leakage-limitation for use in rotative machinery applications. It is a further object of the invention to provide, as part of that system, improved nonmetallic leakage-limiting devices for rotative machinery applications, which devices are fabricated substantially from solid, completely-halogenated polymers of olefinic hydrocarbons, such as polytetrafluoroethylene and polymonochlorotrifluoroethylene, which polymers have been blended, i.e., "filled," with one or more suitable inert materials. Another object of this invention is to provide an improved technique for limiting leakage around the rotative elements of turbo machinery, and to provide improved materials of construction and configuration for leakage-limiting devices illustrating such technique. These and other objects and benefits of the instant invention will become more readily apparent from a reading of the following description of the invention, to be taken in conjunction with the attached drawings.

Figure 2:
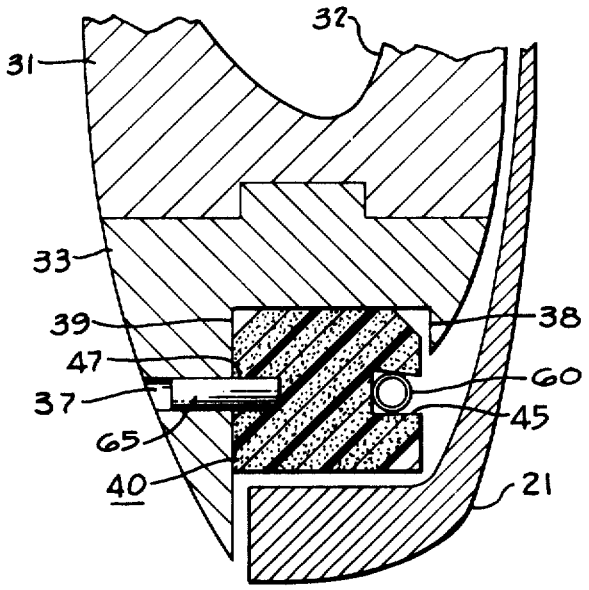
Figure 3:
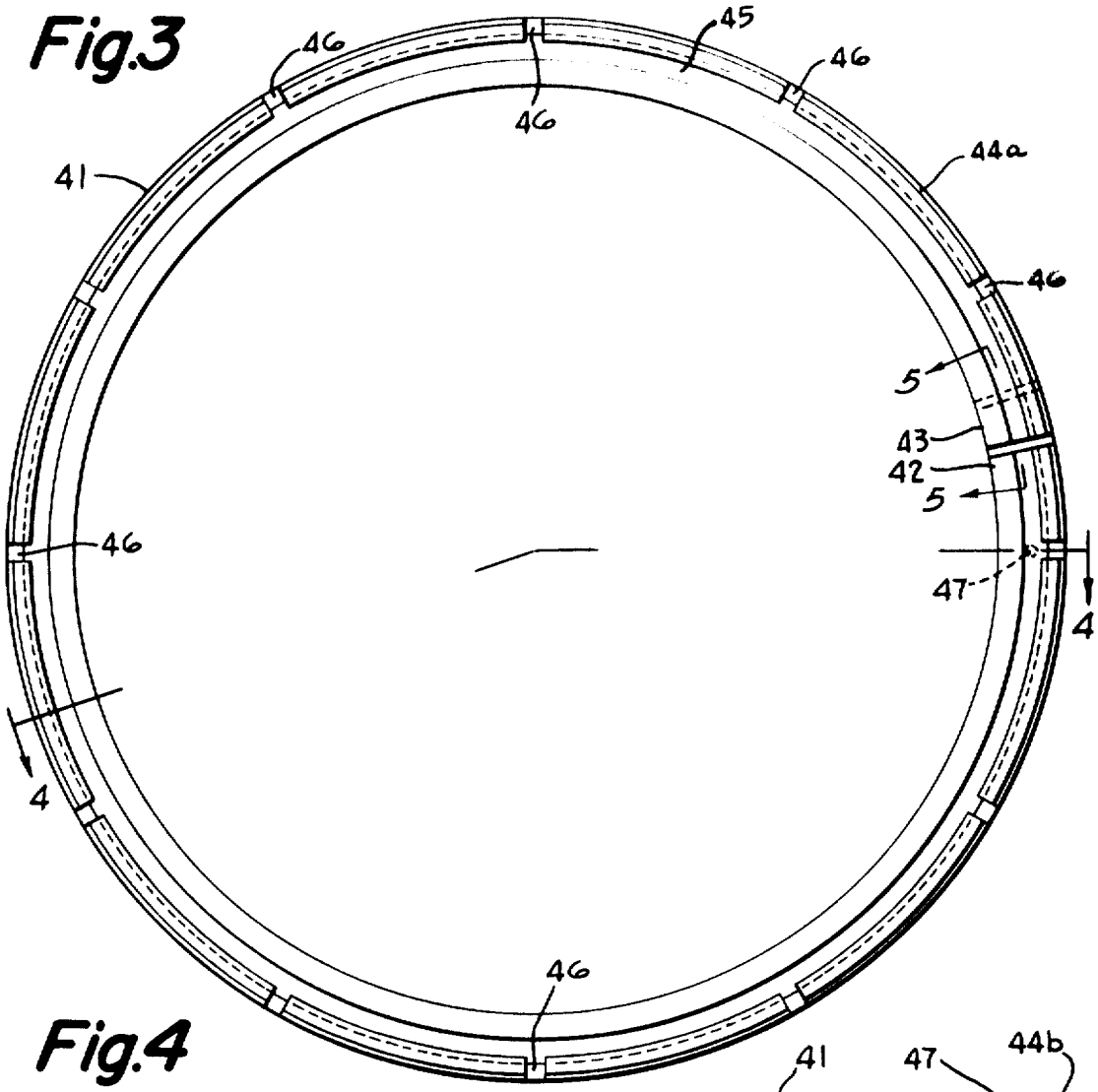
Figure 4:
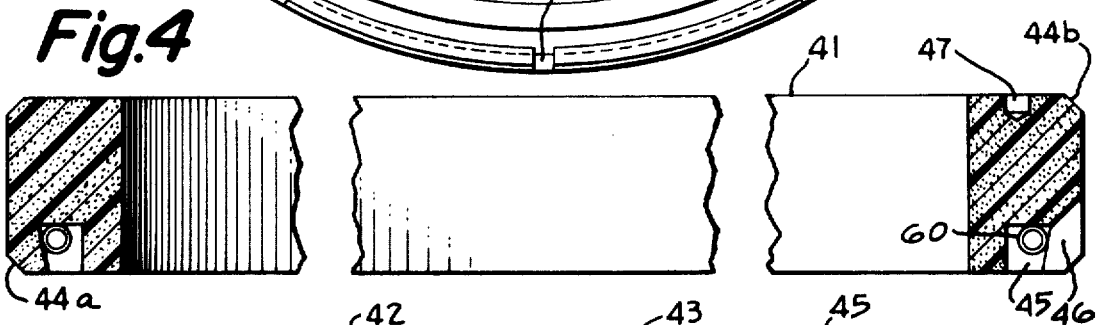
Figure 5:
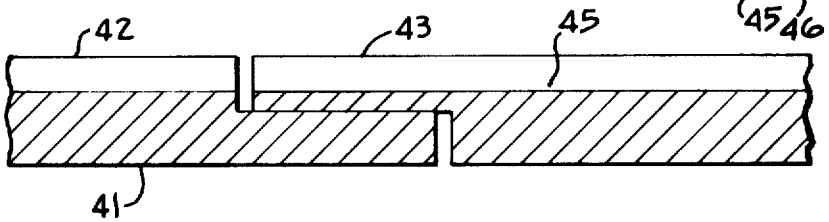

FIGURE 1 is a partial cross-sectional view of the central portion of a single-stage or multi-stage centrifugal compressor, illustrating two typical applications of the leakage-limiting system of this invention. FIGURE 2 is an expanded cross-sectional view of one application as shown in the compressor of FIGURE 1. FIGURE 3 is a plan view of a leakage-limiting device made in accordance with the invention. FIGURE 4 is a sectional view of the device of FIGURE 3, taken along axis 4—4. FIGURE 5 is another sectional view of the device of FIGURE 3, taken along axis 5—5.

In accordance with the present invention, there is provided a new and improved leakage-limiting combination for rotative machinery applications, said combination comprising (1) a leakage-limiting ring device of desired configuration and fabricated from specified materials, (2) positioning means for fixing the position of said leakage-limiting ring device in relation to a nonrotative machine member, and (3) retaining means for ensuring that said leakage-limiting ring device remains in place and in contact with said positioning means under static conditions. The above-described combination of elements and in particular the material from which the said ring device is constructed, together with the provisions of a suitable "cold clearance" between the ring device and the rotative machinery member under static conditions, are critical to the successful practice of the invention.

The material from which the improved leakage-limiting ring devices of the present invention are fabricated comprises the so-called filled, high-molecular-weight, solid polymers of completely-halogenated suitable olefinic hydrocarbons. In particular, suitable base polymers for preparing the filled materials for constructing the improved ring devices of this invention include polymers of halogenated ethylenic hydrocarbons, such as polytetrafluoroethylene and polymonochlorotrifluoroethylene. These specific polymers are available commercially, for example as identified by the trademarks "Teflon" and "Kel-F," respectively, and also by the mark "Halon" and the like. Base resins or polymers of the type described are particularly suitable for use in accordance with the practice of this invention because of their high temperature stability, their almost complete inertness and their excellent structural and mechanical properties, such as a direction variation in the temperature coefficient of expansion when molded, resistance to abrasion, high strength, great rigidity and ready machinability. The preparation and specific properties of these types of base polymers are fully described in Encyclopedia of Chemical Technology, volume 11, pages 687–703 (1953), edited by Kirk and Othmer. Other suitable materials can on occasion be employed in the practice of this invention.

In order to provide the actual materials for fabricating the leakage-limiting ring devices of this invention, the above-mentioned base polymers are blended, or "filled," with suitable amounts of such materials are graphite, carbon, coke flour, cadmium oxide, bronze, copper, glass fiber, ceramics, and molybdenum disulfide, either alone or in combination with another or similar material. Preferred fillers are glass fiber, carbon, graphite or a mixture of one or more thereof with molybdenum disulfide. A typical example of a filled polymeric material suitable for fabricating an improved leakage-limiting ring device for practice of this invention comprises a solid, homogeneous blend of 30 percent by weight of graphite and 70 percent by weight of a suitable polytetrafluoroethylene. Other suitable filled polymeric materials include a similar base polymer filled with either: (A) 15 percent by weight of glass fiber; (B) 25 percent by weight of glass fiber; (C) 15 percent by weight of graphite; (D) 60 percent by weight of bronze; (E) 20 percent by weight of glass fiber and 5 percent by weight of graphite; or (F) 15 percent by weight of glass fiber and 5 percent by weight of molybdenum disulfide. These filled materials and others are available commercially under such trademarks as "Flur-O-Fran" and "Flurocomp." Their preparation and particularly the properties are described in an article by J. T. O'Rourke appearing in Machine Design for Sept. 13, 1962.

The use of suitable halohydrocarbon polymers with fills of suitable character and amount is particularly advantageous in the practice of this invention. Thus, such materials permit of tremendous flexibility not heretofore experienced, in that such materials allow application of the invention to rotative machinery which is adapted to handle any type of fluid, i.e., gas or liquid, and whether corrosive or noncorrosive, clean or dirty, or dry or mixed with liquid. In addition, the almost complete inertness of such materials renders them usable under a wide range of process conditions and in varying atmospheres that otherwise might engender reactions such as polymerization.

The improved leakage-limiting ring devices of the present invention are commonly fabricated from the above-described filled halohydrocarbon polymers by conventional molding and machining techniques. Thus, a molding material consisting of the desired blend of filler and base polymer in suitable granular or powdered form is placed into a mold of selected configuration and dimensions. The filled mold is then subjected to increasing pressure at a controlled rate of increase to effect a compacting or preforming of the molded part. The pressure ultimately to be applied during preforming or compacting is dependent primarily upon the nature of the molding material. As an alternative technique, the filled mold may be preheated, prior to compacting, at a temperature of approximately 200° F. or less for a period of several hours. Preheating reduces the ultimate pressure required to be applied during the subsequent compacting step. After compacting, and after cooling if preheating has been employed, the mold is stripped from the preformed part. The preformed part is then sintered to relieve stress by heating at a controlled rate to a temperature of approximately 700° F., at which temperature it is maintained for a suitable dwell time dependent upon size and configuration, and then cooled at a controlled rate to room temperature. The molded part after sintering is then ready for final machining.

As a further alternative technique, the preformed part can be sintered while still in its mold and then subjected to "coining" or the application of pressure while slowly cooling. After "coining" the mold is stripped from the part and the latter then stress-relieved by heating at a temperature of approximately 600° F. or less for a period of time dependent upon size and configuration and cooling to room temperature. The molded part is then ready for final machining.

In accordance with still another alternative technique, the filled mold is placed within an oven equipped for the controlled application of pressure as well as heat, and therein is subjected to the desired combination and sequence of both heat and pressure. The mold is then stripped and the molded part machine-finished.

The molded parts, prepared as above described, are then finished by conventional means, such as by drilling, milling, routing, grinding and other suitable machining techniques. The ring devices may be fabricated in the form of either a single piece of several segments, although the former is preferred. When the ring is fabricated from a single piece of material, it may be in the form of either a solid ring or a split ring and, in the latter case, may embody one of a variety of types of joints such as, for example, an angle cut, a step cut, a butt joint, a seal joint, and the like. In practice, a plurality of rings can be employed, embodying more than one type of joint. In all cases, however, the object is substantially to eliminate radial leakage through the ring gap.

Within the foregoing limits, the general configuration and cross-section of the leakage-limiting ring devices of this invention may be of any desired form. However, as noted above, it is essential that the clearance between the ring device and the rotative machinery member be sufficient, under static and start-up conditions, normally to avoid undue contact. This requires that such clearance be at a maximum under static conditions, so that the rotative member, in going through any period of excessive vibration such as attends its critical speed range, will not unduly contact the ring device. However, one of the distinct advantages of the improved leakage-limiting ring devices of this invention is that any such content, if experienced, will not result in damage to the rotative member and will not result in undue and permanent deformation of the ring device. Rather, because of the nature of the materials here employed, such contact actually results in improved operation by virtue of the substantially low coefficient of friction exhibited by the material from which the ring device is fabricated. Consistent with the above-described consideration, it is desirable that the static clearance between the ring device and the rotative member be as small as possible in order to reduce leakage and maximize efficiency during operation of the machinery.

As noted above, it is essential that the improved leakage-limiting ring device of this invention be combined with and accompanied by the use both (A) of positioning means suitable for fixing the position of the ring device relative to the nonrotative machinery member, and (B) of restraining means suitable for keeping the ring device in position and in contact with said positioning means during static conditions. The co-action by these additional means with the properties exhibited by the material from which the ring device is constructed produces one of the major benefits to be derived from practice of this invention.

The filled polymers of completely halogenated olefinic hydrocarbon compounds used to fabricate the novel leakage-limiting ring devices of the invention have temperature coefficients of expansion substantially in excess of those exhibited by the metallic materials from which the rotative and nonrotative machinery members normally are constructed. Consequently, once the machine on start-up has passed through its critical speed range and has arrived at its operating speed, the temperature of the various parts of the machine will gradually increase along with imposition of the load on the machine. In the absence of constraint, the sealing ring normally would expand with increased temperature in both centrifugal radial and circumferential dimension at a rate greater than the corresponding metallic parts of the machine. This would result in an increase in the clearance between the seal and the rotative member during operation, together with a consequent increase in leakage and decrease in operating efficiency. In accordance with the present invention, however, the new and improved leakage-limiting ring device is retained from centrifugal radial and unlimited overall circumferential expansion through temperature, rise, and is constrained to expand centripetally towards the rotative machine member. This produces a reduced clearance, with attendant decreased leakage and increased efficiency at operating speeds and temperatures, while yet permitting maximum clearance under static conditions and during start-up when vibration can normally be expected to be at its greatest.

In ring devices of relatively large size, it may be necessary or desirable on occasion to provide axially-oriented, circumferentially-spaced notches around the perimeter of the ring device, so as to absorb some portion of the expansion caused by temperature increase. The extent to which this becomes necessary will be dictated by such factors as the size of the ring, the speed of the machine, the desired running clearances and other similar consideration.

The positioning means by which the ring devices of this invention are fixed in position relative to the nonrotative machinery member and restrained from outward expansion include but are not limited to: suitably-oriented recesses provided in the nonrotative machinery member, such as the casing, so as to fixibly position the leakage-limiting ring device in the proper axial position relative to the rotative member. In addition to the provision of a recess in the casing or other nonrotative member, other suitable means also may be employed, such as appropriately-located ridges or projections on either side of the ring position and the like. In addition to the provision of means for ensuring proper axial positioning of the ring, it also is necessary to provide means to prevent rotative motion of the ring device relative to the nonrotative machine member. This can be accomplished readily by means such as an axially-oriented pin or pins positioned in and connecting adjacent apertures in the ring and nonrotative machinery member, respectively.

It also is necessary according to the present invention to employ suitable retaining means, to insure that the ring device remains properly positioned and in contact with the positioning means under static conditions and during start-up of the machine. Retaining means found to be suitable for this purpose include a continuous spring which is positioned around and in contact with the inner perimeter or other suitable section of the ring device under such compression that it presses radially outwardly against the ring and causes it to seat firmly in the positioning means and against the nonrotative machine member. Other conventional expanding means also can be employed. For example, a cut circular expander in the form of either a flat strip or round rod, and made from spring material, is also suitable and can be used.

FIGURE 1 illustrates application of the present invention to a single-stage or multi-stage centrifugal compressor for fluids. Two applications are shown. Other applications in addition to those shown also exist in a compressor of this type. FIGURE 1 is a sectional view of a portion of one stage of the compressor. In FIGURE 1, an impeller 20 is flexibly attached to rotatable shaft 10. Impeller 20 is constrained to rotate in casing 30 through fluid passages created by such portions of the casing as 31, 32 and 34. The direction of fluid flow is centrifugal and from left to right in the figure.

FIGURE 1 shows application of the new and improved combination leakage-limiting system at two locations in the compressor, namely: at 40, which is at the zone between the impeller suction and the corresponding part of the interstage diaphragm or casing; and at 50, which is at the zone between the interstage diaphragm or casing and the shaft at the discharge side of the impeller. Leakage-limiting ring device 40 is shown located by positioning means consisting of an annular recess formed in separable toe portion 33 of casing 30. Retaining means (not shown) also are provided in order to ensure that ring device 40 remains in cooperative relationship with the positioning means under static conditions.

In the second application of the present invention illustrated in FIGURE 1, leakage-limiting ring device 50 is shown located in positioning means consisting of an annular recess formed in the separable toe portion 35 of casing 30. Ring device 50 is located opposite that part of shaft 10 upon which is mounted optional collar 15. Retaining means (not shown) also are provided to retain ring device 50 in cooperative relationship with the positioning means under static conditions. Under dynamic conditions retention of devices 50 and 40 is aided by centrifugal forces and differential pressure.

FIGURE 2 is an expanded cross-sectional view of that application of the invention which is shown at 40 in FIGure 1. In FIGURE 2, the external impeller wall of impeller 20 is shown at 21, while 31 and 32 represent portions of the interstage diaphragm of casing 30. Separable toe portion 33 of casing 30 includes positioning means for device 40. The positioning means consists of a recess in the separable toe portion 33 of the interstage diaphragm formed by boundaries 38 and 39. The positioning means further comprises pin 65 which fits in holes 37 and 47 and is adapted to prevent rotational movement of ring device 40 about the shaft and in the casing. Retaining means 60 maintains ring device 40 in cooperative relationship and contact with the positioning means under static conditions. Retaining means 60 in the figure consists of a circularly-formed helical spring under compression and located in recess 45 of device 40.

FIGURE 3 is a plan view of leakage-limiting ring device 40, as illustrated in FIGURES 1 and 2. This view shows ring device 40 consisting of ring 41 which is made from materials specified herein to be suitable and is cut so as to have ends 42 and 43. Ring 41 is beveled at edges 44a and at 44b (not shown in FIGURE 3). Ring 41 contains annular recess 45 which accommodates the retaining means also necessary for practice of the invention. Located in spaced relationship around the exterior perimeter of ring 41 are axially-oriented slots or expansion grooves 46. The projection of the hole which is to receive pins 65 is shown at 47.

FIGURE 4 is a sectional view along axis 4—4 of FIGURE 3, and shows ring device 40 in cross-section. In FIGURE 4, ring 41 is shown with beveled edges 44a and 44b, and with annular recess 45 and cylindrical hole 47. The retaining means consisting of a compressed and circularly-formed helical spring are shown at 60.

FIGURE 5 is a sectional view along axis 5—5 of FIGURE 3, showing in detail the manner of joint of ring 41 at ends 42 and 43.

In order to illustrate a specific embodiment of the new and improved combination leakage-limiting system of the present invention, a ring device having the configuration shown in FIGURES 3, 4 and 5 is fabricated from a material suitable for use in accordance with the present invention. The material so employed consists of polytetrafluoroethylene filled with 25 percent by weight of carbon so as to form a homogeneous solid blend. This material is commercially available from Liquid Nitrogen Processing Corporation under the product designation. "Flurocomp" No. 195. The ring is positioned in and cooperates with a positioning means consisting of a rectangularly-shaped recess in the casing of a centrifugal compressor formed as shown in FIGURES 2 and 1. The ring also cooperates with a retaining means consisting of a circularly-formed helical spring under compression which is positioned and cooperates with an annular recess of substantially rectangular cross-section such as is shown in FIGURE 2. The positioning means also includes an axially-oriented pin connecting the ring device with the casing to prevent rotative movement, all as shown in FIGURE 2.

When the above combination leakage-limiting system is employed as above described in a centrifugal compressor, an improved performance in terms of a reduction in leakage and an increased efficiency of operation is achieved over conventional metallic labyrinth and solid carbon types of sealing rings. In addition, the ring device of the present invention provides longer service before replacement, permits of a wider range of process applications, and offers simplicity, ease and economy of manufacture, installation and replacement.

Other embodiments and applications of the new and improved combination leakage-limiting system of the present invention will be obvious to those skilled in the art. Thus, other applications of the combination system can be made in a centrifugal compressor such as, for example: the zones between the casing and the shaft; additional zones between the interstage diaphragm and the shaft as well as those between the interstage diaphragm and the impeller; and in conventional pressure-balancing devices. It is specifically to be understood that all such applications and embodiments are contemplated as coming within the scope of the present invention.

The invention claimed is:

1. In a machine comprising a rotative member and a relatively non-rotative member, the combination which comprises: (a) a leakage-limiting ring, said ring surrounding said rotative member with a clearance under static conditions; and (b) means for positioning said ring in a fixed relationship with said nonrotative member and with a predetermined amount of clearance therebetween, means for retaining said ring in said relationship with said nonrotative member, and said ring having a low coefficient of friction and being of a synthetic plastic material preventing damage to said rotative member if contact therewith should occur during start-up of the machine and said ring having a coefficient of thermal expansion substantially in excess of those of said rotative and nonrotative members so that said ring tends to expand away from said rotative member during increase of the machine temperature while it reaches normal operating conditions, said means for positioning said ring having a coefficient of thermal expansion substantially less than said ring and having radially directed surfaces coacting with said ring to restrain the latter from axial movement, said positioning means additionally having an axial surface restraining the outer circumference of said ring from radial movement in one direction but permitting the inner circumference of said ring to expand radially in another direction toward said rotative member, thus providing a reduced clearance with attendant decreased leakage and increased efficiency at operating speeds and temperatures while permitting maximum clearance under static conditions and during start-up when vibration can normally be expected to be at its greatest.

2. Combination according to claim 1 wherein said ring is made of a material including a polymer and filler, said polymer being selected from the group consisting of polytetrafluoroethylene, polymonochlorotrifluoroethylene and mixtures thereof, and said filler being selected from the group consisting of graphite, carbon, ceramic material, glass fiber, molybdenum disulfide, bronze, and mixtures thereof.

3. Combination according to claim 2 wherein a retaining means retains said relationship under fixed conditions and consists of a circularly-formed compressed helical spring located in an annular recess in said ring.

4. Combination according to claim 1 wherein said ring is fabricated in a single piece.

5. Combination according to claim 3 wherein said annular recess is of substantially rectangular cross-section and is situated in one of the sides of said ring.

6. Leakage-limiting device according to claim 5 which also contains a plurality of axially-oriented notches around its outer perimeter.

*7. In a machine comprising a rotative member and a relatively non-rotative member, the combination which comprises: a leakage-limiting ring, and means for positioning said ring in a fixed relationship in one of said members with a predetermined amount of clearance between said ring and the other of said members under static conditions; means for retaining said ring in said relationship with said one of said members, said ring having a low coefficient of friction and being of a synthetic plastic material preventing damage to the other of said members if contact therewith should occur during start-up of the machine, said ring having a coefficient of thermal expansion substantially in excess of those of said members, said means for positioning said ring having a coefficient of thermal expansion substantially less than said ring and having means coacting with said ring to restrain the latter from axial movement, said positioning means additionally having a surface restraining one circumference of said ring from radial movement in one direction but permitting the other circumference of said ring to expand radially in another direction toward said*

*other of said members, thus providing a reduced clearance with attendant decreased leakage and increased efficiency at operating speeds and temperatures while permitting maximum clearance under static conditions and during start-up when vibration can normally be expected to be at its greatest.*

References Cited

The following references, cited by the Examiner, are of record in the patented file of this patent or the original patent.

UNITED STATES PATENTS

| | | | |
|---|---|---|---|
| 2,163,464 | 6/1939 | Llewellyn | 277—166 X |
| 2,998,987 | 9/1961 | Taschenberg et al. | 277—137 X |

| | | | |
|---|---|---|---|
| 3,104,884 | 9/1963 | Kerlin | 277—209 X |
| 3,325,172 | 6/1967 | Herbold | 277—26 |
| 2,886,479 | 5/1959 | Riedel | 277—220 X |
| 2,908,516 | 10/1959 | Stein | 277—137 |
| 2,934,368 | 4/1960 | Adamson | 277—153 |
| 3,100,648 | 8/1963 | Lee et al. | 277—163 X |
| 3,114,561 | 12/1963 | Creath et al. | 277—205 X |

SAMUEL B. ROTHBERG, Primary Examiner